United States Patent
Olucha Soler et al.

(10) Patent No.: US 9,451,844 B2
(45) Date of Patent: Sep. 27, 2016

(54) DEVICE FOR DIRECTLY OBTAINING JUICE FROM FRUIT

(75) Inventors: Jordi Olucha Soler, Castellón de la Plana, Castellón (ES); Alberto Arza Moncunill, Castellón de la Plana, Castellón (ES)

(73) Assignee: Lekue, SL, Barcelona (ES)

( * ) Notice: Subject to any disclaimer, the term of this patent is extended or adjusted under 35 U.S.C. 154(b) by 499 days.

(21) Appl. No.: 13/984,310

(22) PCT Filed: Apr. 11, 2012

(86) PCT No.: PCT/ES2012/000091
§ 371 (c)(1),
(2), (4) Date: Oct. 3, 2013

(87) PCT Pub. No.: WO2012/140289
PCT Pub. Date: Oct. 18, 2012

(65) Prior Publication Data
US 2014/0013966 A1    Jan. 16, 2014

(30) Foreign Application Priority Data
Apr. 11, 2011  (ES) .................................. 201100361

(51) Int. Cl.
| | |
|---|---|
| A23B 5/00 | (2006.01) |
| A23N 1/00 | (2006.01) |
| A47J 43/14 | (2006.01) |
| A23J 1/00 | (2006.01) |
| B30B 9/02 | (2006.01) |
| A47J 19/02 | (2006.01) |

(52) U.S. Cl.
CPC ............... *A47J 19/02* (2013.01); *A47J 19/022* (2013.01)

(58) Field of Classification Search
CPC ...... A47J 19/02; A47J 19/022; A47J 19/025; A23N 1/003
USPC .......................... 99/495, 501, 502, 503, 505; 100/107–108
See application file for complete search history.

(56) References Cited

U.S. PATENT DOCUMENTS

| | | |
|---|---|---|
| 883,786 A | 4/1908 | Chatain |
| 1,432,166 A | 10/1922 | During |
| 1,649,755 A | 11/1927 | Thompson |
| 1,747,957 A | 2/1930 | Silveue |
| 2,746,379 A | 5/1956 | Covington |
| 4,889,044 A | 12/1989 | Rosenfield |

FOREIGN PATENT DOCUMENTS

| | | |
|---|---|---|
| CN | 2388895 Y | 7/2000 |
| DE | 34 01 973 A1 | 8/1985 |

(Continued)

OTHER PUBLICATIONS

International Search Report for PCT/ES2012/000091 mailed Jul. 4, 2012.

*Primary Examiner* — Dana Ross
*Assistant Examiner* — Lindsey C Teaters
(74) *Attorney, Agent, or Firm* — RatnerPrestia

(57) ABSTRACT

The invention includes a tubular elongated body with suction openings determining a filter, intended to be inserted into the fruit, the tubular elongated body being provided with a device for grinding the pulp of the fruit, an insertion stop and a top opening, the top opening ending in a coupling arrangement of a juice-dispensing member, such as a spraying head, a brush or a drop-by-drop juice-dispensing member.

8 Claims, 3 Drawing Sheets

(56) References Cited

FOREIGN PATENT DOCUMENTS

| | | |
|---|---|---|
| DE | 85 28 396 U1 | 1/1986 |
| ES | 478494 A1 | 11/1979 |
| FR | 774 454 | 12/1934 |
| GB | 344260 | 3/1931 |
| GB | 350094 | 6/1931 |
| GB | 512309 | 8/1939 |
| GB | 2 404 844 A | 2/2005 |
| JP | 09-294672 | 11/1997 |
| WO | WO 95/17119 | 6/1995 |
| WO | WO 2004/037054 A1 | 5/2004 |
| WO | WO 2008/068748 A2 | 6/2008 |

DEVICE FOR DIRECTLY OBTAINING JUICE FROM FRUIT

This application is the U.S. National Phase Application of PCT/ES2012/000091, filed Apr. 11, 2012, which claims priority to Spanish Patent Application No. U 201100361, filed Apr. 11, 2011, the contents of such applications being incorporated by reference herein.

The present invention, as its name indicates, relates to a device for obtaining fruit juice of the type that is inserted directly into the fruit and is characterised by comprising means for its insertion into the fruit and its attachment thereto, means for the inner tearing of the fruit for obtaining the juice, straining means and securing means of different fixtures for the consumption or application of the obtained juice.

The field of the art to which it pertains is that of kitchenware and catering tools.

BACKGROUND OF THE INVENTION

Devices for directly extracting juice from fruit have been known for quite some time. To that end, they have a body having a tubular shape that is inserted into the fruit and the outer end thereof ends in a mouthpiece.

Some of the existent ones have a series of holes in the part that is inserted allowing the passage of juice from the fruit into said tube.

Patent GB2404844 discloses a device made up by a tube inside another tube, both having holes for the passage of juice. On its bottom end, the outer tube has a jigsaw finish that allows squeezing the fruit. The inner tube is connected with a top cylindrical tube, which serves as a straw, through an outer ring that is wider than the outer tube and which, in addition, acts as a stop.

Patent WO9517119 discloses an apparatus for directly extracting fruit juice formed by a rigid straw or cylindrical spout that is manually inserted into the fruit and has holes for the passage of juice. Midway along the spout, an outer ring is located that is wider than the spout, downwardly concave and serving as a stop and sealing element so that that air entry into the fruit is impeded when the user sucks in through the straw.

Patent DE8528396U discloses an apparatus for extracting fruit juice having an inverted frustoconical basin with holes and a helical edging surrounding the basin. On its top, it has a wider basin wherein the extracted juice is collected.

Patent FR774454 discloses an apparatus for extracting fruit juice formed by a tube that is inserted into the fruit, a couple of blades connected to the tube and allowing the breakdown of the pulp and squeezing the fruit, and a collar that serves as a closure of a hole drilled into the fruit, the tube being holed and one of its ends being sharp for its easy insertion into the fruit, whereas the other end has the shape of a mouthpiece, the juice passing therethrough when the fruit is squeezed.

Patent GB344260 discloses an apparatus for extracting fruit juice made up by a holed cylindrical tube, open on one end and open or closed on the other, wherein the open end is sharp in order to facilitate its entry into the fruit, whereas the other, exterior end may be open or closed and abuts the outer ring, which is wider than the tube serving as a stop.

Patent GB350094 discloses an apparatus facilitating the extraction of fruit juice formed by a cylindrical tube having holes or orifices and a tip end by means of which the tube is inserted into the fruit down to an outer, wider ring that serves as a stop, the fruit being squeezed and the juice entering the orifices and coming out through the open end.

Patent JP9294672 discloses a tool for extracting fruit juice formed by a sharp-ended cylindrical body having horizontal blades and holes for the entry of juice on its bottom, said blades going through the cylindrical body.

Patents DE 3401973, GB 512309 and U.S. Pat. No. 1,432,166 are further state-of-the-art documents disclosing a juice extractor according to the referred configuration or structure.

Fruit juices may be for immediate, direct consumption, but they can also be used in catering, wherefore the use of different application devices—such as sprayers, brushes or drop-by-drop applicators, among others—is necessary.

Many of these application devices must rely on an impurity-free juice, so that seeing to its filtering prior to its application is essential. Even the possibility of placing additional filters before utilisation may be convenient, depending on the particular use.

There are also application devices that may require inner clearance, for instance, to insert a dip tube, as would be the case of sprayers.

None of the referred background art solves the problem of generating a hollow body closed on its bottom that serves simultaneously as a spout and a filter, that is easy to insert into the fruit and to secure thereto, and to which different devices can be adapted for the consumption or use of the extracted juice, even though these devices require, as is the case of a sprayer, inserting a dip tube into the juicer.

The discussed disadvantages are solved by the proposed invention.

DISCLOSURE OF THE INVENTION

In order to solve the discussed disadvantages, the invention being proposed comprises:

A device for directly obtaining fruit juice having a tubular elongated body with suction openings determining an inverted frustoconically-shaped filter, intended to be inserted into the fruit, said tubular elongated body being provided with means for grinding the pulp of the fruit, an insertion stop and a top opening, the ensemble being characterised in that said top opening ends in a coupling arrangement of a juice-dispensing member.

According to this invention, said tubular elongated body making up a hollow filter is tip-ended and closed on its bottom and it comprises an outer helical blade.

Said juice-dispensing member, in turn, is made up by a spraying head associated with a dip tube extending into the tubular body.

Alternatively, said juice-dispensing member is made up by a brush or a drop-by-drop juice-dispensing member.

Said outer helical blade extends round the filter side following a spiral pattern from its lower end up to the stop.

In one embodiment, said coupling arrangement has the shape of a screw thread.

Said insertion stop is made up by an outer ring or flange located below the coupling arrangement.

Each of said items accomplishes a function that, even if intuitive, is explained below.

The filter with the inverted frustoconical elongated shape is closed on its bottom and presents a tip end that favours its penetration into the fruit.

This closed filter defines an inner space that will be accessed only by the fruit juice, the pulp, seeds and other fruit impurities remaining outside.

A helical blade surrounding the aforementioned filter has been arranged facilitating the filter penetration by generating a screw effect at the same time the fruit pulp is being torn at its passage, releasing juice, and once the filter is in its usage position, it contributes to securing it.

An oversized ring has been arranged outside the filter that will act as a stop and contribute to increasing the stability of the device, as well as a closure that will prevent juice leaks.

Below this ring, strips of elastic material may optionally be included sealing the edges of the opening drilled into the fruit.

The open end of the filter presents a mouthpiece incorporating means that allow securing a general-purpose device, such as, for instance, a sprayer, a brush or a drip system, among others.

DESCRIPTION OF AN EMBODIMENT OF THE INVENTION

Figure 1:
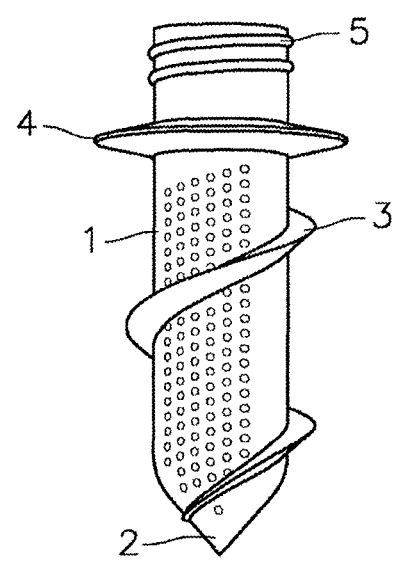
FIG. 1 shows the tip-ended (2) filter body (1), the helical blade running round it (3), the outer ring (4) acting as a stop and the open portion of the filter in the shape of a mouthpiece with securing means—a thread (5) in this case—for a dosing member not shown herein.
Figure 2:
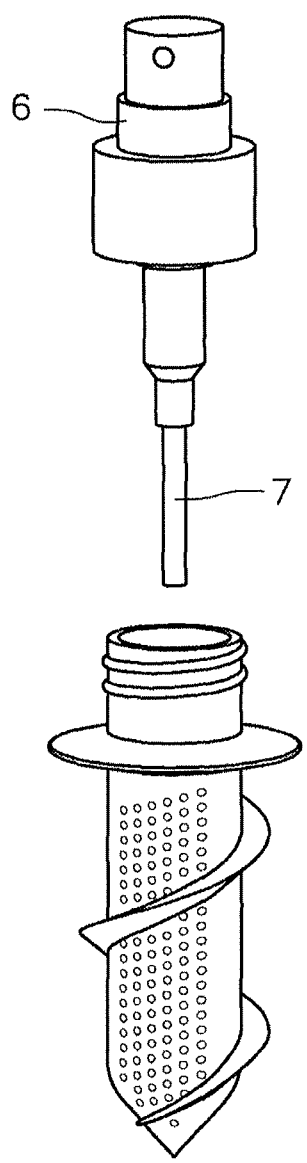
FIG. 2 shows an exploded view of the filter body (1) with the helical blade (3) and the outer ring (4), a dosing member also being depicted—in this case, a sprayer (6) whose dip tube (7) will be inserted into the filter—.
Figure 3:
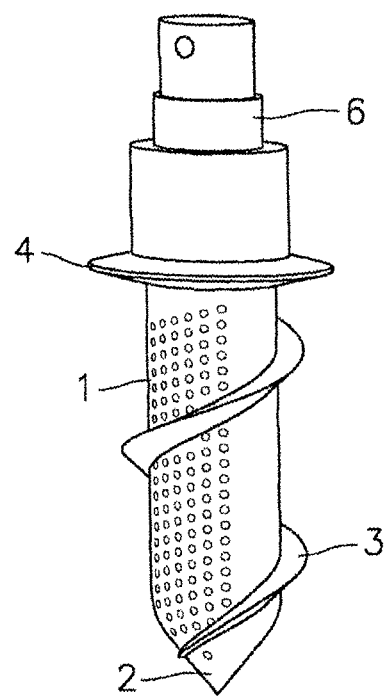
FIG. 3 shows the ensemble formed by the juice-extracting device and the dosing sprayer, both ready to be inserted into the fruit.

An embodiment is hereinafter described that is non-limiting, but rather demonstrative of the invention.

The device for directly obtaining juice from fruit comprises:

A hollow filter with an inverted frustoconical shape closed on its bottom and having a tip end.

A helical blade going round most of said filter on the outside.

The top of the filter is open and in the shape of a mouthpiece.

The mouthpiece comprises means for securing a device—a sprayer in this case—thereto for applying or dosing the juice.

An outer ring protrudes below the mouthpiece.

In the proposed embodiment, the filter is made of a resilient and self-supporting material that, in turn, is the support for the helical blade surrounding it round its entire length destined to be inserted into the fruit.

This blade contributes to the insertion of the filter into the fruit, secures it thereto and, in addition, it sets out to rip up the fruit pulp, causing juice generation.

The device is inserted into the fruit until the ring underneath the mouthpiece acts as a stop, contributes to the stability of the inserted device and prevents the spillage of juice round the edges of the opening.

Strips of elastic material may optionally be included under the ring so as to better seal the gap existing between the fruit and the device.

The mouthpiece, comprising means for securing an applicator or dosing member, is located on the top.

In the proposed embodiment, the means for securing an applicator or dosing member is a thread, and the chosen member being depicted in the figures is a sprayer.

The invention claimed is:

1. A device for directly obtaining fruit juice comprising:
   a tubular elongated body with suction openings determining a filter, which is to be inserted into a fruit, wherein the tubular elongated body comprises:
   a grinding device for grinding pulp of the fruit,
   an insertion stopper;
   and a top opening ending in a coupling arrangement wherein a juice-dispensing member is releasably engaged,
   wherein said juice-dispensing member is a spraying head associated with a dip tube extending into the tubular elongated body.

2. The device according to claim 1 wherein said tubular elongated body making up a hollow filter is tip-ended and closed at a bottom thereof.

3. The device according to claim 2 wherein said tubular elongated body comprises an outer helical blade providing said grinding device.

4. The device according to claim 3 wherein said outer helical blade extends round the filter side following a spiral pattern from its lower end up to said insertion stopper.

5. The device according to claim 2 wherein said bottom of the tubular elongated body making up a hollow filter has an inverted frustoconical shape.

6. The device according to claim 1 wherein said coupling arrangement has the shape of a screw thread.

7. The device according to claim 1 wherein said insertion stopper is made up by an outer ring or flange located below the coupling arrangement.

8. The device according to claim 7 wherein, under said outer ring, strips of an elastic material are arranged to seal the edges of the opening drilled into the fruit.

* * * * *